US006978971B1

(12) United States Patent
Dun (10) Patent No.: US 6,978,971 B1
(45) Date of Patent: Dec. 27, 2005

(54) METHODS AND APPARATUSES FOR CONTROLLING AIRFLOW PROXIMATE TO ENGINE/AIRFOIL SYSTEMS

(75) Inventor: Roy Dun, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/868,238

(22) Filed: Jun. 15, 2004

(51) Int. Cl.$^7$ .................................................. B34C 9/24
(52) U.S. Cl. ........................ 244/214; 244/130; 244/55
(58) Field of Search .............................. 244/213, 216, 244/218–219, 130, 54, 55

(56) References Cited

U.S. PATENT DOCUMENTS

| | | |
|---|---|---|
| 1,770,575 A | 7/1930 | Ksoll |
| 2,387,492 A | 10/1945 | Blaylock et al. |
| 2,422,196 A | 6/1947 | Flader |
| 2,458,900 A | 1/1949 | Erny |
| 2,652,812 A | 9/1953 | Fenzl |
| 2,665,085 A | 1/1954 | Feeney et al. |
| 2,864,239 A | 12/1958 | Taylor |
| 2,891,740 A | 6/1959 | Campbell |
| 2,892,312 A | 6/1959 | Allen et al. |
| 2,920,844 A | 1/1960 | Marshall et al. |
| 2,990,144 A | 6/1961 | Hougland |
| 2,990,145 A | 6/1961 | Hougland |
| 3,102,607 A | 9/1963 | Roberts |
| 3,112,089 A | 11/1963 | Dornier |
| 3,136,504 A | 6/1964 | Carr |
| 3,191,147 A | 6/1965 | Majendie |
| 3,375,998 A | 4/1968 | Alvarez-Calderon |
| 3,447,763 A | 6/1969 | Allock |
| 3,504,870 A | 4/1970 | Cole et al. |
| 3,556,439 A | 1/1971 | Autry et al. |
| 3,653,611 A | 4/1972 | Trupp et al. |
| 3,704,743 A | 12/1972 | Edwards |
| 3,704,828 A | 12/1972 | Studer et al. |
| 3,743,219 A | 7/1973 | Gorges |
| 3,794,276 A | 2/1974 | Maltby et al. |
| 3,831,886 A | 8/1974 | Burdges et al. |
| 3,836,099 A | 9/1974 | O'Neil et al. |
| 3,837,601 A | 9/1974 | Cole |
| 3,862,730 A | 1/1975 | Heiney |
| 3,910,530 A | 10/1975 | James et al. |
| 3,941,334 A | 3/1976 | Cole |

(Continued)

FOREIGN PATENT DOCUMENTS

EP    0 103 038    3/1984

(Continued)

OTHER PUBLICATIONS

U.S. Appl. No. 10/454,417, Neal V. Huynh.

(Continued)

Primary Examiner—Galen Barefoot
(74) Attorney, Agent, or Firm—Perkins Coie LLP (57) ABSTRACT

Methods and apparatuses for controlling airflow proximate to engine/airfoil systems are disclosed. In one embodiment, an aircraft system includes an airfoil and an engine unit at least proximate to the airfoil with a gap between a portion of the airfoil and a portion of the engine unit. The system can further include a flow control device proximate to the gap and positionable among at least three stationary positions, including a retracted position in which the gap has a first area through which fluid can flow, a first extended position in which the gap is at least approximately aerodynamically sealed, and a second extended position in which the gap has a second smaller area through which fluid can flow. A control system can be coupled to the flow control device to move the flow control device among these positions.

40 Claims, 6 Drawing Sheets

U.S. PATENT DOCUMENTS

| | | | |
|---|---|---|---|
| 3,941,341 A | 3/1976 | Brogdon, Jr. | |
| 3,968,946 A * | 7/1976 | Cole | 244/214 |
| 3,992,979 A | 11/1976 | Smith | |
| 3,994,451 A | 11/1976 | Cole | |
| 4,015,787 A | 4/1977 | Maieli et al. | |
| 4,117,996 A | 10/1978 | Sherman | |
| 4,120,470 A | 10/1978 | Whitener | |
| 4,131,253 A | 12/1978 | Zapel | |
| 4,146,200 A | 3/1979 | Borzachillo | |
| 4,171,787 A | 10/1979 | Zapel | |
| 4,189,120 A | 2/1980 | Wang | |
| 4,189,121 A | 2/1980 | Harper et al. | |
| 4,189,122 A | 2/1980 | Miller | |
| 4,200,253 A | 4/1980 | Rowarth | |
| 4,240,255 A | 12/1980 | Benilan | |
| 4,247,843 A | 1/1981 | Miller | |
| 4,262,868 A | 4/1981 | Dean | |
| 4,275,942 A | 6/1981 | Steidl | |
| 4,285,482 A | 8/1981 | Lewis | |
| 4,293,110 A | 10/1981 | Middleton | |
| 4,312,486 A | 1/1982 | McKinney | |
| 4,325,123 A | 4/1982 | Graham | |
| 4,351,502 A | 9/1982 | Statkus | |
| 4,353,517 A | 10/1982 | Rudolph | |
| 4,368,937 A | 1/1983 | Palombo | |
| 4,384,693 A * | 5/1983 | Pauly et al. | 244/207 |
| 4,427,168 A | 1/1984 | McKinney | |
| 4,441,675 A | 4/1984 | Boehringer | |
| 4,461,449 A | 7/1984 | Turner | |
| 4,471,927 A | 9/1984 | Rudolph et al. | |
| 4,475,702 A | 10/1984 | Cole | |
| 4,485,992 A | 12/1984 | Rao | |
| 4,496,121 A | 1/1985 | Berlin | |
| 4,498,646 A | 2/1985 | Proksch | |
| 4,533,096 A | 8/1985 | Baker | |
| 4,553,722 A | 11/1985 | Cole | |
| 4,575,030 A | 3/1986 | Gratzer | |
| 4,637,573 A * | 1/1987 | Perin et al. | 244/54 |
| 4,650,140 A | 3/1987 | Cole | |
| 4,700,911 A | 10/1987 | Zimmer | |
| 4,702,441 A | 10/1987 | Wang | |
| 4,706,913 A | 11/1987 | Cole | |
| 4,717,097 A | 1/1988 | Sepstrup | |
| 4,729,528 A | 3/1988 | Borzachillo | |
| 4,784,355 A | 11/1988 | Brine | |
| 4,786,013 A | 11/1988 | Pohl | |
| 4,792,906 A | 12/1988 | King | |
| 4,856,735 A | 8/1989 | Lotz | |
| 4,860,007 A | 8/1989 | Konicke | |
| 4,899,284 A | 2/1990 | Lewis | |
| 4,962,902 A | 10/1990 | Fortes | |
| 5,046,688 A | 9/1991 | Woods | |
| 5,074,495 A | 12/1991 | Raymond | |
| 5,082,208 A | 1/1992 | Matich | |
| 5,088,665 A | 2/1992 | Vijgen | |
| 5,094,411 A | 3/1992 | Rao | |
| 5,094,412 A | 3/1992 | Narramore | |
| 5,100,082 A | 3/1992 | Archung | |
| 5,114,100 A | 5/1992 | Rudolph | |
| 5,129,597 A | 7/1992 | Manthey | |
| 5,158,252 A | 10/1992 | Sakurai | |
| 5,167,383 A | 12/1992 | Nozaki | |
| 5,203,619 A | 4/1993 | Welsch | |
| 5,207,400 A | 5/1993 | Jennings | |
| 5,244,269 A | 9/1993 | Harriehausen | |
| 5,259,293 A | 11/1993 | Brunner | |
| 5,351,914 A | 10/1994 | Nagao | |
| 5,420,582 A | 5/1995 | Kubbat | |
| 5,441,218 A | 8/1995 | Mueller | |
| 5,474,265 A | 12/1995 | Capbern | |
| 5,535,852 A | 7/1996 | Bishop | |
| 5,544,847 A | 8/1996 | Bliesner | |
| 5,600,220 A | 2/1997 | Thoraval | |
| 5,609,020 A | 3/1997 | Jackson | |
| 5,680,124 A | 10/1997 | Bedell | |
| 5,686,907 A | 11/1997 | Bedell | |
| 5,715,163 A | 2/1998 | Bang | |
| 5,743,490 A | 4/1998 | Gillingham | |
| 5,746,490 A | 5/1998 | Domenig | |
| 5,788,190 A | 8/1998 | Siers | |
| 5,875,998 A | 3/1999 | Gleine | |
| 5,921,506 A | 7/1999 | Appa | |
| 5,927,656 A | 7/1999 | Hinkleman | |
| 5,934,615 A | 8/1999 | Treichler | |
| 5,978,715 A | 11/1999 | Briffe | |
| 5,984,230 A | 11/1999 | Drazi | |
| 6,015,117 A | 1/2000 | Broadbent | |
| 6,045,204 A | 4/2000 | Frazier | |
| 6,073,624 A | 6/2000 | Laurent | |
| 6,076,767 A | 6/2000 | Farley et al. | |
| 6,076,776 A | 6/2000 | Breitbach | |
| 6,109,567 A | 8/2000 | Munoz | |
| 6,161,801 A | 12/2000 | Kelm | |
| 6,188,937 B1 | 2/2001 | Sherry | |
| 6,213,433 B1 | 4/2001 | Gruensfelder | |
| 6,293,497 B1 | 9/2001 | Kelley-Wickemeyer | |
| 6,328,265 B1 | 12/2001 | Dizdarevic | |
| 6,349,798 B1 | 2/2002 | McKay | |
| 6,364,254 B1 | 4/2002 | May | |
| 6,375,126 B1 | 4/2002 | Sakurai | |
| 6,389,333 B1 | 5/2002 | Hansman | |
| 6,443,394 B1 | 9/2002 | Weisend | |
| 6,484,969 B2 | 11/2002 | Sprenger | |
| 6,499,577 B2 | 12/2002 | Kitamoto et al. | |
| 6,547,183 B2 | 4/2003 | Farnsworth | |
| 6,554,229 B1 | 4/2003 | Lam | |
| 6,591,169 B2 | 7/2003 | Jones et al. | |
| 6,598,829 B2 | 7/2003 | Kamstra | |
| 6,598,834 B2 | 7/2003 | Nettle | |
| 6,601,801 B1 | 8/2003 | Prow | |
| 6,622,972 B2 | 9/2003 | Urnes | |
| 6,625,982 B2 | 9/2003 | Van Den Bossche | |
| 6,644,599 B2 | 11/2003 | Perez | |
| 6,651,930 B1 | 11/2003 | Gautier et al. | |
| 6,745,113 B2 | 6/2004 | Griffin | |
| 6,796,534 B2 | 9/2004 | Beyer | |
| 2002/0046087 A1 | 4/2002 | Hey | |
| 2002/0074459 A1 | 6/2002 | Gliene et al. | |
| 2002/0100842 A1 | 8/2002 | Perez | |
| 2003/0058134 A1 | 3/2003 | Sherry | |
| 2003/0132860 A1 | 7/2003 | Feyereisen | |
| 2004/0004162 A1 | 1/2004 | Beyer | |
| 2004/0059474 A1 | 3/2004 | Boorman | |
| 2004/0195464 A1 | 10/2004 | Vassberg et al. | |

FOREIGN PATENT DOCUMENTS

| | | |
|---|---|---|
| EP | 0 370 640 | 5/1990 |
| EP | 0 489 521 | 6/1992 |
| EP | 0947421 | 10/1999 |
| GB | 886136 | 1/1962 |
| GB | 2 144 688 A | 3/1985 |
| WO | WO-02/24530 | 3/2002 |

OTHER PUBLICATIONS

U.S. Appl. No. 60/475,828, Kevin W. Beyer.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).

A340 Flight Controls, SAE Presentation, Publication Date: Circa 1995 (1 page).
Airframe Structural Design, Chen-Yeun Niu, Conmilit Press, 1988 (1 page).
Boeing, 777 Aircraft Maintenance Manual, Sep. 5, 2002 (p. 39).
Drela, Mark, "Design and Optimization Method for Multi-Element Airfoils," MIT Department of Aeronautics and Astronautics, Copright 1993 American Institute of Aeronautics and Astronautics, Inc. (p. 1-11).
Flap Drive System, 777 Maintenance Manual, Publication Date: Circa 1994 (1 page).
Flap Transmission and Support, 777 Maintenance Manual, Publication Date: Circa 1994 (1 page).
MOOG, Component Maintenance Manual, May 1994 (2 pgs).
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
European Search Report for European Patent Application No. EP 03 07 7840, The Boeing Company, Nov. 4, 2003 (2 pages).
International Search Report, PCT/US03/19724/ Sep. 11, 2003, 5 pages.
Niu, Chen-Yen, Airframe Structural Design, Chen-Yeun Niu, Conmilit Press, 1988 (1 page).
Drela, M., "Optimization Techniques In Airfoil Design," MIT Aero & Astro, 29 pages.
European Search Report for European Patent Application No. 03 07 7840, The Boeing Company, Nov. 4, 2003 (2 pages).
Hansen, H., "Application of Mini-Trailing-Edge Devices in the Awiator Project," Airbus Deutschland, EGAG, Hunefeldstr. 1-5, D-28199 Bremen, Germany, 9 pages.
International Search Report, PCT/US03/19724/ Sep. 11, 2003, 5 pages.
Junkers JU 52/3M (2 pages); http://www.wpafb.af.mil/museum/outdoor/od16 [Accessed Aug. 7, 2003].
Petrov, A.V., "Certain Types of Separated Flow over Slotted Wings," Fluid Mechnanics—Soviet Research, vol. 7, No. 5, Sep.-Oct. 1978.
The High Speed Frontier, Chapter 2: The High-Speep Airfoil Program, "Supercritical" Airfoils, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfolis," National Aeomautics and Space Administration, Aug. 1974 (pp. 8-18).

* cited by examiner

METHODS AND APPARATUSES FOR CONTROLLING AIRFLOW PROXIMATE TO ENGINE/AIRFOIL SYSTEMS

TECHNICAL FIELD

Embodiments of the present invention relate to methods and apparatuses for controlling airflow proximate to engine/airfoil systems, for example, on aircraft with wing-mounted engine units.

BACKGROUND

Many modern-day aircraft include leading edge high lift devices (e.g., slats and Krueger flaps) to improve performance during certain phases of flight (e.g., takeoff and landing). Many of these aircraft also have wing-mounted propulsion units that are carried under the wing of the aircraft. The wing-mounted propulsion units can interfere with flow over the wing and detract from aircraft performance.

Figure 1A:
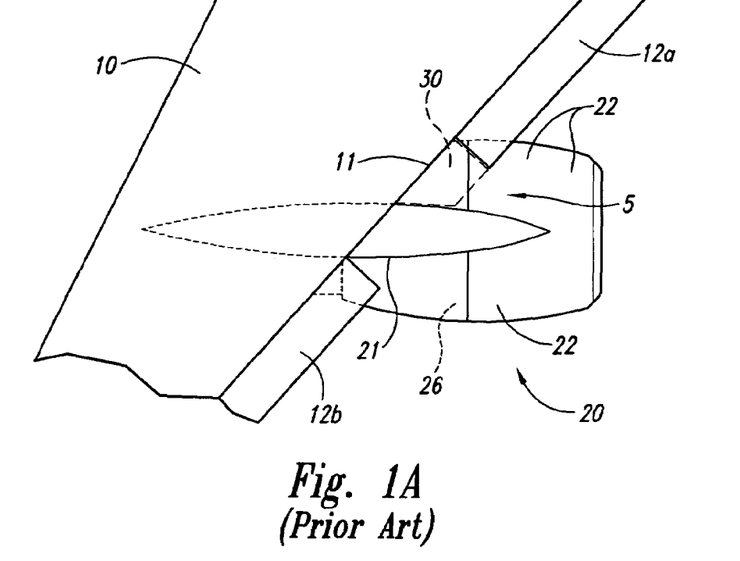
FIG. 1A is a partially schematic top plan view of a wing and an engine in accordance with the prior art.
Figure 1B:
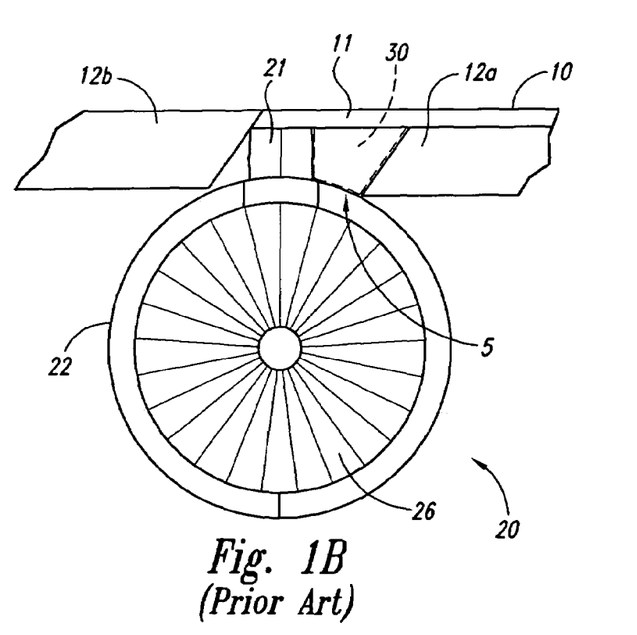
FIG. 1B is a partially schematic front elevation view of the wing and engine shown in FIG. 1B.

FIG. 1A is a partially schematic top plan view and FIG. 1B is a partially schematic front elevation view of an aircraft wing 10 having a wing-mounted propulsion unit 20 in accordance with the prior art. The wing 10 can include an inboard high lift leading edge device 12a and an outboard high lift leading edge device 12b. The propulsion unit 20 can include an engine 26, positioned within a housing 22, which is supported by a pylon 21. The propulsion unit 20 can be coupled to the wing 10 via the pylon 21 so that at least a portion of the propulsion unit 20, including the pylon 21, extends forward from the leading edge 11 of the wing 10. Accordingly, there can be a gap 5 between a portion of the housing 22 and a portion of the wing 10. This gap 5 can be a major contributor to the flow interference created by the wing-mounted propulsion unit arrangement.

The local flow pattern around and through the gap 5 can be quite complex, especially when the aircraft is operated at higher angles of attack and/or when the high lift leading edge devices 12a, 12b are deployed. The interface between the wing 10 and propulsion unit 20, including the gap 5, is often optimized for the cruise condition when the high lift leading edge devices 12a, 12b are stowed. As angle of attack is increased above cruise values, the air flow through the gap 5 can often cause the performance (e.g., local drag coefficient and/or local lift coefficient) of the local wing section proximate to the gap 5 to degrade as compared to similar wing sections located away from the gap 5. Additionally, because the propulsion unit 20 interferes with the installation and/or deployment of high lift leading edge devices, the high lift leading edge devices 12a, 12b often do not extend laterally across the wing 10 in the area where the gap 5 is located. Accordingly, the local wing section proximate to the gap 5 does not get the performance benefits provided by the high lift leading edge devices 12a, 12b. Even if the high lift leading edge devices 12a, 12b extend laterally across the gap 5, the flow interference created by the wing 10 and the propulsion unit 20 can reduce the performance of the local wing section proximate to the gap 5.

One approach to addressing this problem is to provide the aircraft with a small flap-type device 30 that seals the gap when the high lift devices 12a, 12b are deployed. In FIG. 1, the flap-type device 30 is shown in the sealed position by dashed lines. In the sealed position, the flap-type device 30 extends from the bottom portion of the wing 10 and seals against a portion of the engine housing 22. Additionally, if the housing 22 moves with the deployment of a thrust reverser, the flap-type device 30 or a portion of the flap-type device 30 can be configured to move with the housing 22 to maintain the sealed position. The flap-type device 30 can also have a retracted position in which it is positioned proximate to the bottom of the wing 10 during cruise when the high lift leading edge devices 12a, 12b are retracted. In the sealed position, the flap-type device prevents air from flowing through the gap 5, reducing drag and/or increasing a lift/drag ratio during certain phases of flight (e.g., during takeoff). A drawback of this arrangement is that the drag and/or lift profile of the local portion of the wing 10 proximate to the gap 5 can still be less than desirable for selected phases of flight conducted with the high lift leading edge devices 12a, 12b deployed. For example, during a landing phase of flight it can be more desirable to increase a maximum lift coefficient than to minimize drag, requiring a different configuration than is provided by the flap-type device 30 in either the retracted position or the sealed position.

SUMMARY

The present invention is directed generally toward methods and apparatuses for controlling airflow proximate to engine unit/airfoil systems. One aspect of the invention is directed toward an aircraft system having an airfoil and an engine unit. The engine unit can be at least proximate to the airfoil with a gap between a portion of the airfoil and a portion of the engine unit. The system can further include a flow control device proximate to the gap and positionable among at least three stationary positions. The three stationary positions can include a retracted position in which the gap has a first area through which fluid can flow, a first extended position in which the gap is at least approximately aerodynamically sealed, and a second extended position in which the gap has a second area through which fluid can flow. The second area can be smaller than the first area. In further aspects of the invention, the aircraft system can include a flow control device having multiple flow surface sections movable relative to each other.

Another aspect of the invention is directed toward a method for making an aircraft system that includes installing a flow control device at least proximate to an airfoil and an engine unit. The method can further include coupling a control system (e.g., an actuator and/or a computer) to the flow control device and configuring the control system to position the flow control device among at least three stationary positions. The three stationary positions can include a retracted position in which a gap between a portion of the airfoil and a portion of the engine unit has a first area through which fluid can flow, a first extended position in which the gap is at least approximately aerodynamically sealed, and a second extended position in which the gap has a second area through which fluid can flow, with the second area being smaller than the first area.

DETAILED DESCRIPTION

The present disclosure describes methods and apparatuses for controlling airflow proximate to engine/airfoil systems, for example, on aircraft having wing-mounted engine units. Several specific details of the invention are set forth in the following description and in FIGS. 2–8 to provide a thorough understanding of certain embodiments of the invention. One skilled in the art, however, will understand that the present invention may have additional embodiments, and that other embodiments of the invention may be practiced without several of the specific features described below.

Figure 2:
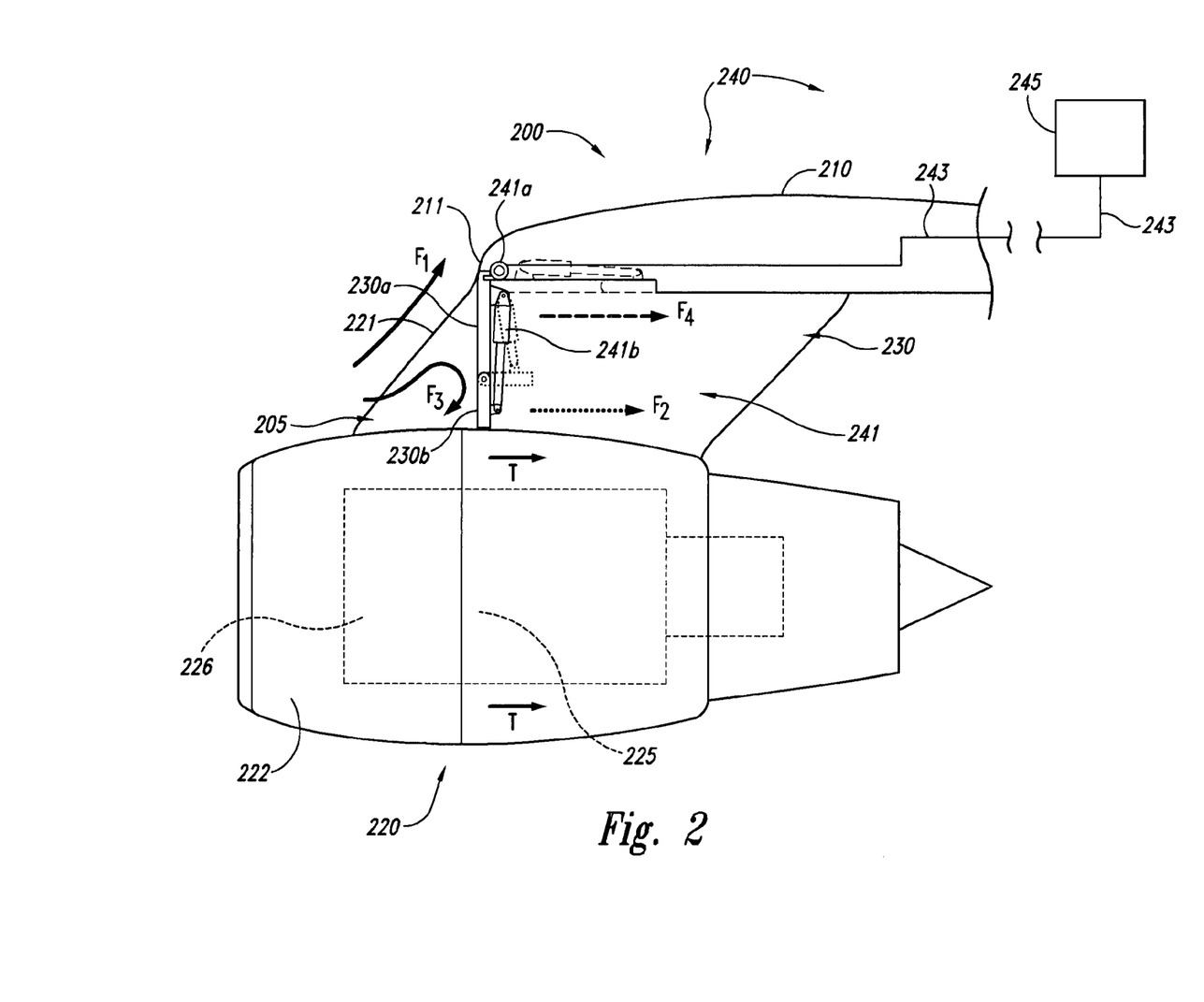
FIG. 2 is a partially schematic illustration of an aircraft system having an airfoil, an engine unit, and a flow control device that includes a Krueger flap type device in accordance with an embodiment of the invention.

FIG. 2 is a partially schematic illustration of an aircraft system 200 having an airfoil 210, an engine unit 220, and a flow control device 230 that includes a Krueger flap type device in accordance with an embodiment of the invention. The engine unit 220 can be located proximate to the airfoil 210 and can include an engine 226, positioned within a housing 222, and a pylon 221. The engine unit 220 can be coupled to the airfoil 210 via the pylon 221 and can be positioned under the airfoil 210 with a portion of the engine unit 220 extending forward of a leading edge 211 of the airfoil 210. This arrangement can form a gap 205 extending between a portion of the housing 222 and a portion of the leading edge 211 of the airfoil 210. The flow control device 230 can be used to control the fluid flow through the gap 205 to yield selected performance characteristics from the section of the airfoil 210 proximate to the gap 205.

The flow control device 230 can be coupled to the airfoil 210 and can be positioned proximate to the gap 205. The flow control device 230 can include multiple flow surface sections (shown in FIG. 2 as a first section 230a and a second section 230b) that are movable relative to each other. In other embodiments, the flow control device 230 can have more or fewer sections, including a single section. The flow control device 230 can also be positionable among at least three stationary positions (e.g., the flow control device 230 can be stopped and held in each position), including a retracted position, a first extended position, and a second extended position.

In FIG. 2, the flow control device 230 is shown (in solid lines) in the first extended position so that the gap 5 between a portion of the engine unit 220 (e.g., the housing 222) and the airfoil 210 is at least approximately aerodynamically sealed. Accordingly, the flow control device 230 can generally prevent fluid flow or allow only a nominal amount of fluid flow (e.g., air) through the gap 205. In the first extended position, the fluid flow proximate to the flow control device 230 is forced generally upward from the engine unit 220 and over the airfoil 210, as shown by arrows F1 (although the fluid flow can also form vortices, as shown by arrow F3). During certain operating conditions and/or phase(s) of flight (e.g., takeoff), this configuration can improve the performance characteristics (e.g., decrease the drag and/or increase the lift/drag ratio) of the section of the airfoil proximate to the gap 205, as compared with a system lacking the flow control device 230.

During other operating conditions (e.g., cruise conditions), the flow control device 230 can be positioned in the retracted position (shown by the dashed lines in FIG. 2) in which the gap 205 has a first area through which fluid can flow. In the retracted position, the flow control device 230 can be positioned proximate to the lower surface of the airfoil 210 behind the leading edge 211 of the airfoil 210 to allow fluid to flow through the gap 205, as shown by arrows F2 and F4. The fluid flow through the gap 205 can provide a flow pattern, different from the flow pattern associated with the first extended position, that provides a distinct set of desired performance characteristics at selected operating conditions and/or phase(s) of flight. For example, the retracted position can provide a smooth flow pattern that results in low drag during low angle of attack operations and/or high speed cruise.

The dotted lines show the flow control device 230 in a second extended position that can provide selected performance characteristics (e.g., an increase in maximum lift coefficient) during other operating conditions and/or phase(s) of flights (e.g., landing). In the second extended position, the flow control device 230 is positioned to provide a second area through which fluid can flow, with the second area smaller than the first area associated with the retracted position described above. For example, the flow control device 230 can be placed in the first extended position, discussed above, and the second portion 230b of the flow control device 230 can be pivoted upwardly from the housing 222 to allow fluid flow through a portion of the gap 205. Accordingly, as fluid approaches the gap 205, a portion of the fluid can pass through the gap (shown by arrow F2) and a portion of the fluid can be forced generally up and over the airfoil 210 (shown by arrow F1). The fluid flow proximate to the gap 205 can provide a fluid flow pattern, different from those associated with the retracted and first extended positions, that provides a distinct set of desired performance characteristics at selected operating conditions and/or phase(s) of flight. For example, the second extended position can provide a flow pattern that increases the maximum lift coefficient of a section of the airfoil 210 proximate to the gap 205 during the landing phase of flight.

The aircraft system 200 shown in FIG. 2 can also include a control system 240 to position the flow control device 230 among the at least three stationary positions. The control system 240 can include actuators 241, signal paths 243, and a computer 245. In FIG. 2, two actuators are shown as a first actuator 241a and a second actuator 241b. Control systems in other embodiments can have more or fewer actuators 241.

The first actuator 241a can include a hydraulic actuator coupled between the airfoil 210 and the first section 230a of the flow control device 230 and can be configured to move the flow control device 230 between the retracted and the first extended position. The second actuator 241b can include an electric actuator and can be coupled between the first and second sections 230a, 230b of the flow control device 230 to move the flow control device 230 between the first extended position and the second extended position. For example, the second actuator 241b can move the flow control device 230 between the first extended position and the second extended position by moving the second section 230b of the flow control device 230, while the first section 230a of the flow control device 230 is held stationary by the first actuator 241a. In certain embodiments, the first and second actuators 241a, 241b can operate simultaneously, for example, to move the flow control device 230 between the retracted and the first extended positions. In other embodiments, the first and second actuators 241a, 241b can operate sequentially.

The computer 245 can be connected to the first and second actuators 241a, 241b by the signal paths 243 and can be programmed to control the movement of the flow control device 230 among the retracted, first extended, and second extended positions. In other embodiments, more or fewer actuators 241 can be used to position the flow control device 230, and/or the actuators 241 can be connected to the flow control device 230 in other arrangements (e.g., connected to different sections of the flow control device 230). In still other embodiments, the control system 240 can have different kinds of elements and/or can transmit different kinds of signals. For example, in certain embodiments the control system 240 can be a purely mechanical system, a purely electrical system, a hydraulic system, or any combination thereof. In other embodiments, the signal paths 243 can include fiber optic pathways. In yet other embodiments of the invention, the control system 240 can direct the flow control device 230 to move to more than three stationary positions, providing aircraft designers with an increased capability to tailor fluid flow patterns proximate to the gap 205 for a variety of different operating conditions.

In certain embodiments, the engine unit 220 can include a thrust reverser 225. At least a portion of the engine housing 222 can be coupled to the thrust reverser and can be configured to move aft when the thrust reverser is deployed, as shown by arrows in FIG. 2. At least a portion of the flow control device 230 (e.g., a piece, a section, or the entire flow control device 230) can be configured to move with the portion of the engine housing 222 when the flow control device 230 is in the first extended position so that the gap 205 remains at least approximately aerodynamically sealed and/or to allow the engine housing 222 to move. In other embodiments, the thrust reverser 225 can cause at least a portion of the engine housing 222 to move differently (e.g., in a different direction) and at least a portion of the flow control device 230 can be configured to move with the portion of the engine housing 222. In still other embodiments, at least a portion of the flow control device 230 can be configured to move with the portion of the engine housing 222 when the flow control device 230 is in the second extended position. This feature can allow the second area associated with the flow control device 230 being in the second extended position (discussed above) to be held at least approximately constant as the thrust reverser 225 causes the housing 222 to move.

Figure 3A:
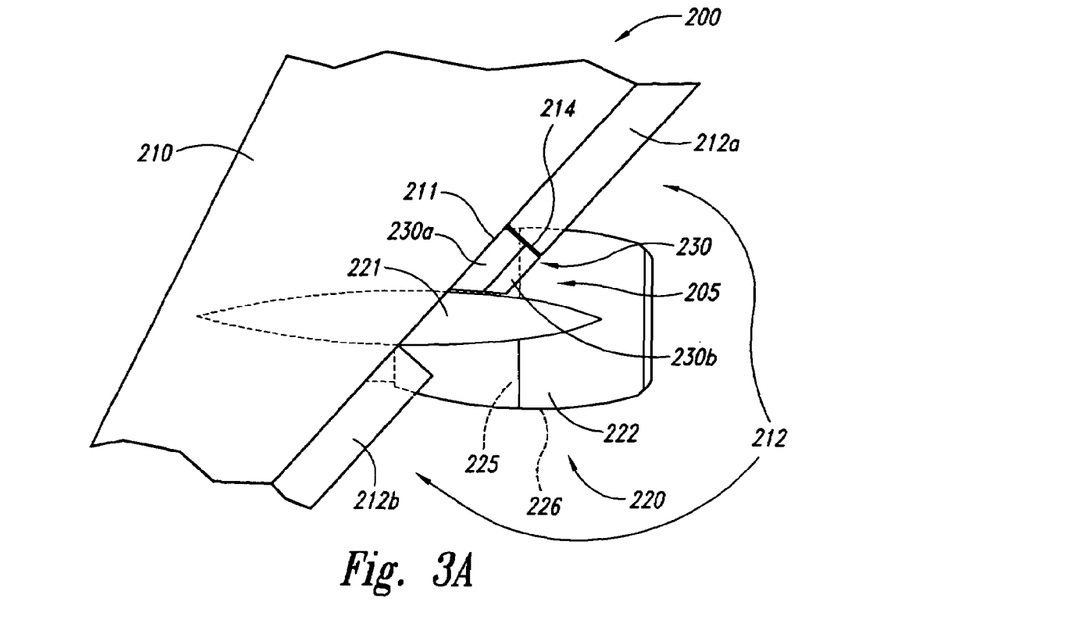
FIG. 3A is a partially schematic top plan view of the aircraft system shown in FIG. 2.
Figure 3B:
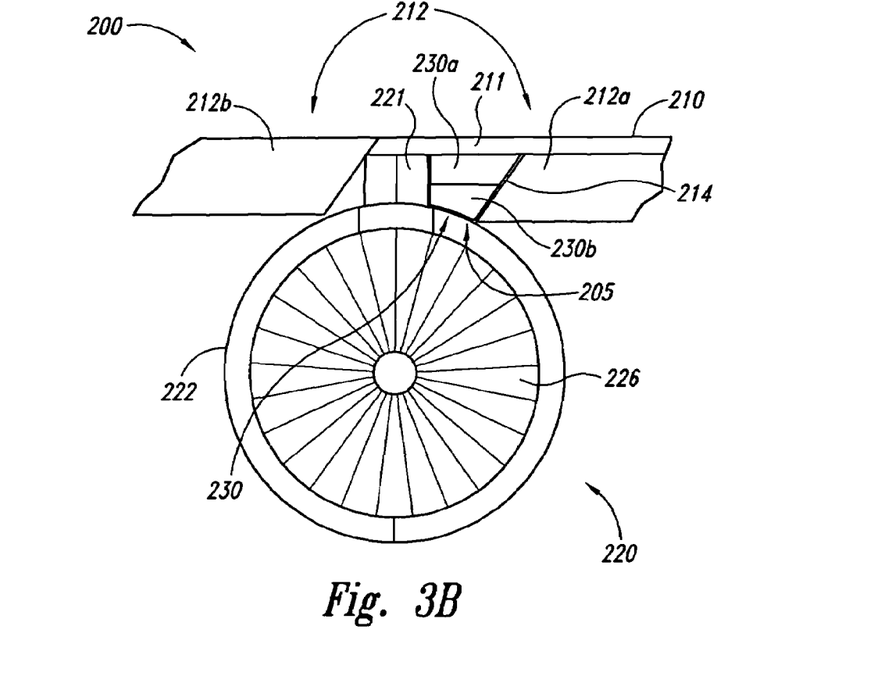
FIG. 3B is a partially schematic front elevation view of the aircraft system shown in FIG. 2.

FIG. 3A is a partially schematic top plan view and FIG. 3B is a partially schematic front elevation view of the aircraft system 200 shown in FIG. 2 with the flow control device 230 in the first extended position. The airfoil 210 can include at least one leading edge device 212 laterally disposed from the flow control device 230. In FIGS. 3A and 3B, two leading edge devices 212 are shown as an inboard leading edge device 212a and an outboard leading edge device 212b. In other embodiments, the airfoil 210 can have more or fewer leading edge devices 212, including no leading edge devices 212. In FIGS. 3A and 3B, the flow control device is shown at least approximately aerodynamically sealed against at least a portion of the pylon 221 and at least a portion of a lateral edge 214 of the inboard leading edge device 212a to control the fluid flow proximate to the gap 205. In other embodiments, the flow control device 230 is not aerodynamically sealed against the pylon 221 and/or the inboard leading edge device 212a to control the fluid flow proximate to the gap 205, producing different flow patterns than those resulting from the arrangement shown in FIGS. 3A and 3B.

In further embodiments of the invention, the airfoil 210 and the engine unit 220 can include other arrangements and/or components, and the gap 205 can be formed between other portions of the airfoil 210 and the engine unit 220. For example, in certain embodiments the engine unit 220 is not directly coupled to the airfoil 210 (e.g., the engine unit 220 can be located proximate to the airfoil 210, but coupled to a fuselage of the aircraft) and/or the engine unit 220 does not extend in front of the leading edge 211 of the airfoil 210. Additionally, in some embodiments additional structural elements associated with the airfoil 210, the engine unit 220, a portion of the flow control device 230 (even when in the retracted position), and/or other aircraft components can protrude into the gap 205, even when the flow control device 230 is in the retracted position. For example, in certain embodiments the pylon 221 can be located behind the gap 205. In still other embodiments, the airfoil 210 and engine unit 220 can define multiple gaps 205 (e.g., multiple gaps of varying widths located side by side or separated by aircraft components) and/or the system can include multiple flow control devices 230. For example, a gap 205 and a flow control device 230 can be located outboard of the pylon 221.

A feature of foregoing embodiments described above with reference to FIGS. 2–3B is that the fluid flow proximate to the gap can be controlled to affect the local lift and/or drag characteristics of the airfoil. An advantage of this feature is that aircraft performance can be tailored for specific phases of flight, providing an increase in aircraft performance over that available from current aircraft systems. Additionally, increases in aircraft performance can reduce overall operating costs, for example, by allowing an aircraft to carry additional weight into and/or out of selected airfields.

Figure 4:
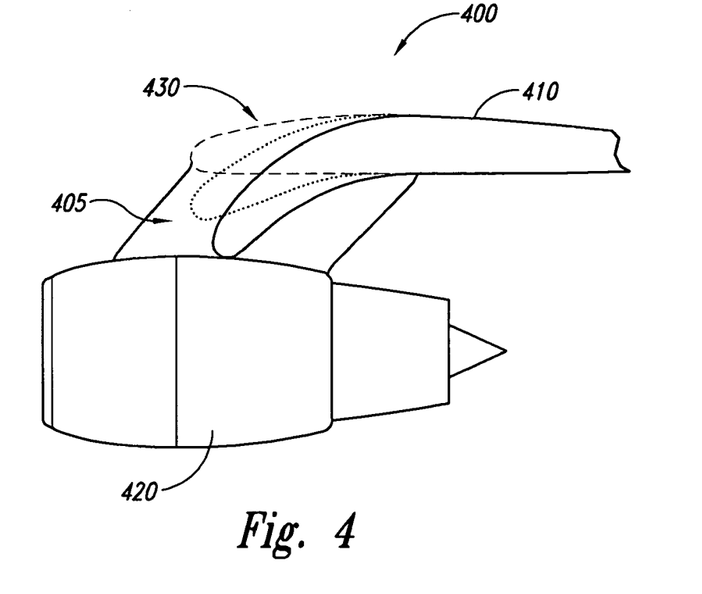
FIG. 4 is a partially schematic illustration of an aircraft system having a flow control device that includes a variable camber leading edge device in accordance with another embodiment of the invention.

In other embodiments, the flow control devices can include other types of control surfaces. For example, FIG. 4 is a partially schematic illustration of an aircraft system 400 having an airfoil 410, an engine unit 420, and a flow control device 430 that includes a variable camber leading edge device in accordance with another embodiment of the invention. The engine unit 420 can be located proximate to the airfoil 410 with a gap 405 between a portion of the engine unit 420 and a portion of the airfoil 410. The flow control device 430 can be coupled to the airfoil 410 and can be located proximate to the gap 405. The flow control device 430 can be positionable among at least three stationary positions, including a retracted position, a first extended position, and a second extended position. In the retracted position, shown in dashed lines, the gap 405 can have a first area through which fluid can flow. In the first extended position, shown in solid lines, the gap 405 can be at least approximately aerodynamically sealed. In the second extended position (shown in dotted lines), the gap 405 can have a second area, smaller than the first area, through which fluid can flow. The flow control device 430 can control the airflow proximate to the gap 405 to provide selected performance characteristics, as discussed above with reference to FIGS. 2–3B.

Figure 5:
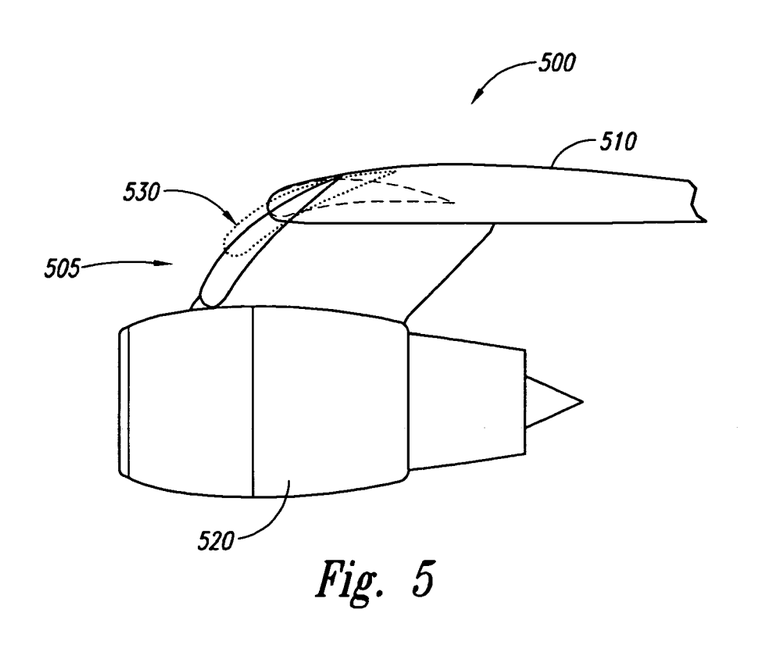
FIG. 5 is a partially schematic illustration of an aircraft system having a flow control device that includes a slat in accordance with still another embodiment of the invention.

FIG. 5 is a partially schematic illustration of an aircraft system 500 having an airfoil 510, an engine unit 520, and a flow control device 530 that includes a slat in accordance with another embodiment of the invention. The engine unit 520 can be located proximate to the airfoil 510 with a gap 505 between a portion of the engine unit 520 and a portion of the airfoil 510. The flow control device 530 can be positionable among at least three stationary positions, including a retracted position (shown in dashed lines), a first extended position (shown in solid lines), and a second extended position (shown in dotted lines). In the retracted position, the gap 505 can have a first area through which fluid can flow. In the first extended position, the gap 505 can be at least approximately aerodynamically sealed. In the second extended position, the gap 505 can have a second area, smaller than the first area, through which fluid can flow. The flow control device 530 can control the airflow proximate to the gap 505 to provide selected performance characteristics, as discussed above with reference to FIGS. 2–3B.

Figure 6:
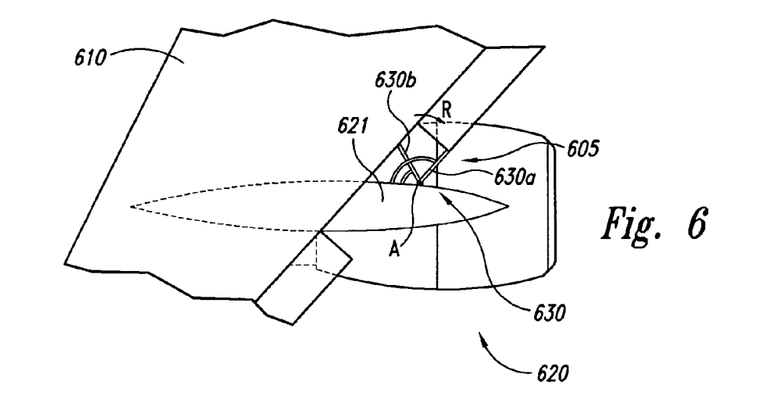
FIG. 6 is a partially schematic illustration of a portion of an aircraft system having a flow control device coupled to a pylon of an engine unit in accordance with yet another embodiment of the invention.

In other embodiments, the flow control device can be coupled to aircraft components other than the airfoil. For example, FIG. 6 is a partially schematic illustration of a portion of an aircraft system having an airfoil 610, an engine unit 620, and a flow control device 630 coupled to the engine unit 620 in accordance with another embodiment of the invention. The engine unit 620 can include a pylon 621 that couples the engine unit 620 to the airfoil 610 with a gap 605 between a portion of the engine unit 620 and a portion of the airfoil 610. The flow control device 630 can be coupled to the pylon 621 and can be located proximate to the gap 605. The flow control device 630 can include multiple sections, shown in FIG. 6 as an upper section 630a and a lower section 630b. The upper and lower sections 630a, 630b can independently rotate forward (away from the pylon 621) and aft (toward the pylon 621) about point A, as shown by arrows to affect fluid flow through the gap 605.

The flow control device 630 can be positionable among at least three stationary positions, including a retracted position, a first extended position, and a second extended position. In the retracted position, the upper and lower sections 630a, 630b of the flow control device 630 can be rotated aft and positioned proximate to the pylon 621 so that the gap 605 has a first area through which fluid can flow. In the first extended position, the lower and upper sections 630a, 630b of the flow control device 630 can be rotated forward and positioned to at least approximately aerodynamically seal the gap 605. In the second extended position, the upper section 630a of the flow control device 630 can be rotated forward and the lower section 630b can be rotated aft and positioned proximate to the pylon 621 (similar to being in the retracted position) so that the gap 605 can have a second area, smaller than the first area, through which fluid can flow. The flow control device 630 can control the airflow proximate to the gap 605 to provide selected performance characteristics, as discussed above with reference to FIGS. 2–3B.

In other embodiments, in the second extended position the upper section 630a of the flow control device 630 can be rotated aft and the lower section 630b can be rotated forward. In still other embodiments, the flow control device 630 can include more or fewer sections and/or other arrangements (e.g., the upper and lower sections 630a, 630b can slide laterally into and out of the pylon 621). In certain embodiments, one or both of the upper and lower sections 630a, 630b of the flow control device 630 can also seal against a lateral edge of a leading edge device as discussed above with reference to FIGS. 3A and 3B.

Figures 7A, 7B:
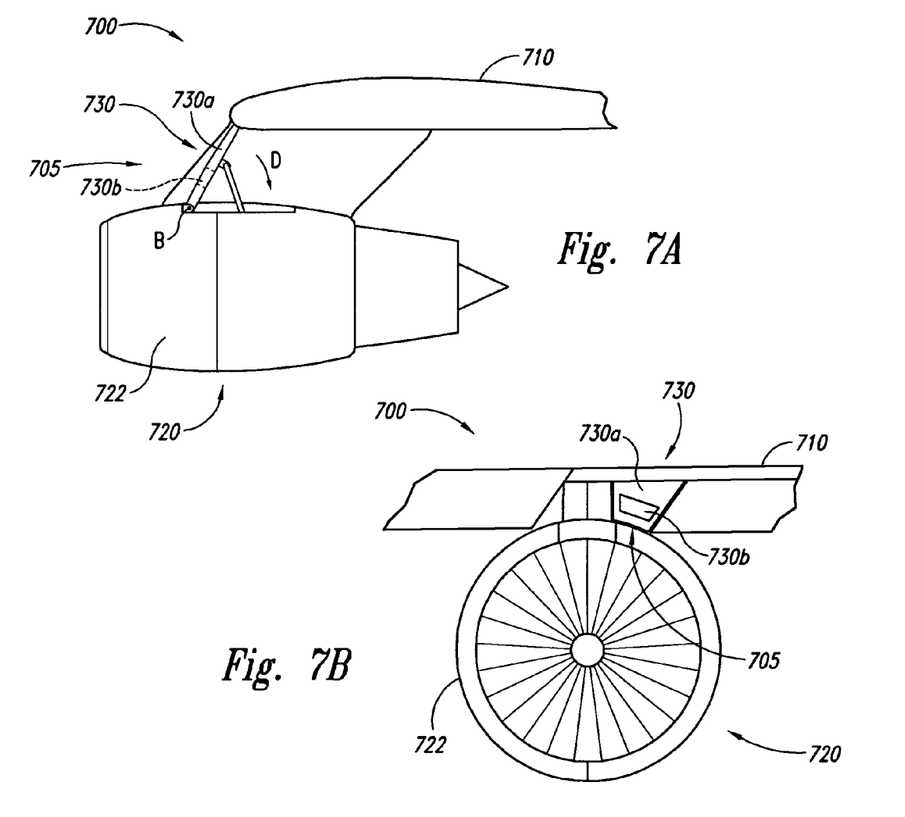
FIG. 7A is a partially schematic side elevation view of an aircraft system having a flow control device coupled to a housing of an engine unit in accordance with still another embodiment of the invention.
FIG. 7B is a partially schematic front elevation view of the aircraft system shown in FIG. 7A.

FIG. 7A is a partially schematic side elevation view and FIG. 7B is a partially schematic front elevation view of an aircraft system 700 having an airfoil 710, an engine unit 720, and a flow control device 730 coupled to the engine unit 720 in accordance with still another embodiment of the invention. The engine unit 720 can include a housing 722 and can be located proximate to the airfoil 710 with a gap 705 between a portion of the engine unit 720 and a portion of the airfoil 710. The flow control device 730 can be coupled to the housing 722 of the engine unit 720 and can be located proximate to the gap 705. The flow control device 730 can include multiple sections, shown in FIGS. 7A and 7B as a main section 730a and a vent section 730b. The vent section 730b can be coupled to the main section 730a, and can be configured to have at least a sealed position and an open position. In the sealed position, the main section 730a and the vent section 730b can form a generally continuous surface that at least restricts (and can prevent) fluid flow through the main section 730a and a vent section 730b of the flow control device 730. In the open position, the vent section 730a can be positioned so that a vent area allows fluid to flow through a portion of the flow control device 730. For example, the vent section 730b can be configured to slide inside the main section 730a to open the vent area.

The flow control device 730 can be positionable among at least three stationary positions, including a retracted position, a first extended position, and a second extended position. In the retracted position, the main and vent sections 730a, 730b of the flow control device 730 can be rotated down about point B, as shown by arrow D, and positioned proximate to the housing 722 of the engine unit 720 so that the gap 705 has a first area through which fluid can flow. In the first extended position, the main and vent sections 730a, 730b of the flow control device 730 can be rotated up about point and positioned so that the main section 730a can be at least approximately aerodynamically sealed against the airfoil 710. Additionally, the vent section 730b can be placed in the sealed position so that the flow control device 730 at least approximately aerodynamically seals the gap 705. In the second extended position, the main section 730a can be at least approximately aerodynamically sealed against the airfoil 710 and the vent section 730b can be placed in the open position, opening the vent area so that the gap 705 can have a second area, smaller than the first area, through which fluid can flow. The flow control device 730 can control the airflow proximate to the gap 705 to provide selected performance characteristics, as discussed above with reference to FIGS. 2–3B.

In other embodiments, the vent area or slot created by the vent section 730b of the flow control device 730 can be located in other parts of the main section 730a of the flow control device 730 (e.g., closer to the airfoil 710). In still other embodiments, the flow control device 730 can have more or fewer sections and/or different types of sections. For example, in other embodiments, the flow control device 730 can include a single section with multiple positions or a flap-type device with hinged segments.

A feature of foregoing embodiments discussed above with reference to FIGS. 4–7B is that the fluid flow proximate to the gap can be controlled to affect the local lift and/or drag characteristics on the airfoil. Accordingly, embodiments of the invention discussed above with reference to FIGS. 4–7B have similar advantages to those discussed with reference to FIGS. 2–3B. Another feature of the foregoing embodiments discussed with reference to FIGS. 4–7B is that the flow control device can include a wide variety of structures and/or can be coupled to a wide variety of components. Accordingly, the flow control device can have the flexibility to meet a wide variety of design constraints. An advantage of this feature is that aircraft designers can use the flow control device to tailor aerodynamic performance for a wide variety of configurations and/or reduce production costs for these configurations.

Figure 8:
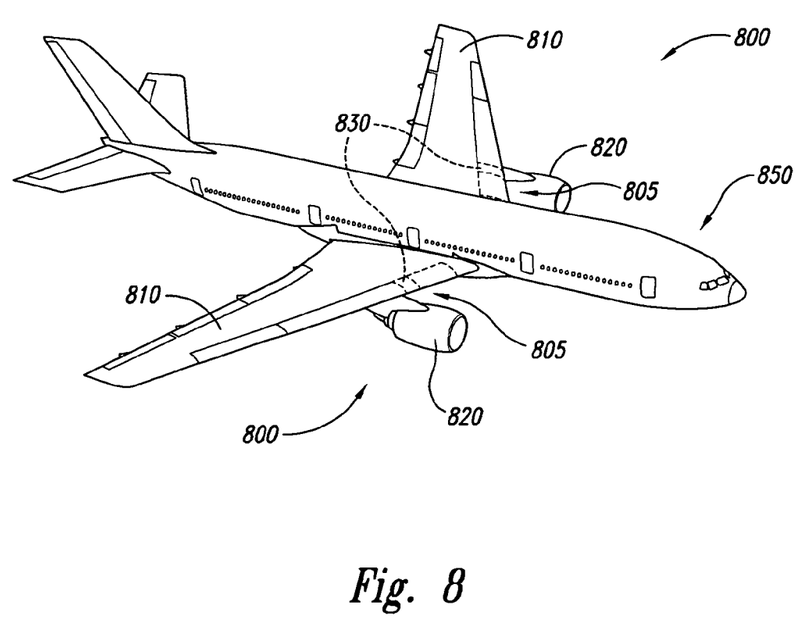
FIG. 8 is a partially schematic illustration of an aircraft having an aircraft system in accordance with an embodiment of the invention.

FIG. 8 is a partially schematic illustration of an aircraft 850 having two aircraft systems 800, each including an airfoil 810 (e.g., a wing), an engine unit 820, and a flow control device 830 in accordance with an embodiment of the invention. Other embodiments can have more or fewer aircraft systems 800 and/or the aircraft systems can share common components (e.g., a computer portion of a control system). In each aircraft system 800, the engine unit 820 is located proximate to the airfoil 810 with a gap 805 between a portion of the airfoil 810 and a portion of the engine unit 820. The flow control device 830 is movable to at least three stationary positions, including a retracted position, a first extended position, and a second extended position, similar to those discussed above with reference to FIGS. 2–7B. In other embodiments, the aircraft 850 can have a different airfoil 810 and engine unit 820 arrangement (e.g., an engine unit 820 depending from another portion of the aircraft 850). In still other embodiments, the flow control device 830 can have a different location and/or a different arrangement (e.g., a flow control device 830 that is similar to the flow control device discussed above with reference to FIG. 6 can be used).

From the foregoing, it will be appreciated that specific embodiments of the invention have been described herein for purposes of illustration, but that various modifications may be made without deviating from the spirit and scope of the invention. Additionally, features described in the context of particular embodiments can be combined or eliminated in other embodiments. For example, in another embodiment, a flow control device can include a first section that depends from an airfoil, similar to embodiments discussed with reference to FIGS. 2–5, and a second section that is coupled to an engine unit, similar to embodiments discussed with reference to FIGS. 6–7B. Accordingly, the invention is not limited except as by the appended claims.

What is claimed is:

1. An aircraft system comprising:
    an airfoil;
    an engine unit having a housing at least proximate to the airfoil with a gap extending between a portion of the airfoil and a portion of the housing of the engine unit; and
    a flow control device proximate to the gap and positionable among at least three stationary positions, including:
        a retracted position in which the gap has a first area through which fluid flows during flight;
        a first extended position in which the gap is at least approximately aerodynamically sealed during flight; and
        a second extended position in which the gap has a second area through which fluid flows during flight, the second area being smaller than the first area.

2. The system of claim 1 wherein the flow control device includes multiple flow surface sections movable relative to each other.

3. The system of claim 1 wherein the engine unit includes a pylon, the engine unit being coupled to the airfoil via the pylon, the engine unit being positioned under the airfoil with a portion of the engine unit extending forward of a leading edge of the airfoil.

4. The system of claim 1 wherein the flow control device is coupled to the airfoil.

5. The system of claim 1 wherein the engine unit includes a pylon and the flow control device is coupled to the pylon.

6. The system of claim 1 wherein the flow control device is coupled to the housing.

7. The system of claim 1 wherein the engine unit includes a thrust reverser, at least a portion of the engine housing being coupled to the thrust reverser to move when the thrust reverser is deployed, and wherein at least a portion of the flow control device moves with the engine housing when the flow control device is in the first extended position.

8. The system of claim 1, further comprising a control system coupled to the flow control device to position the flow control device among the retracted, first extended, and second extended positions.

9. The system of claim 1, further comprising a control system coupled to the flow control device to position the flow control device among the retracted, first extended, and second extended positions, the control system having at least one actuator, the at least one actuator including at least one hydraulic actuator.

10. The system of claim 1, further comprising a control system coupled to the flow control device to position the flow control device among the retracted, first extended, and second extended positions, the control system having at least one actuator, the at least one actuator including at least one electric actuator.

11. The system of claim 1, further comprising a control system coupled to the flow control device to position the flow control device among the retracted, first extended, and second extended positions, at least a portion of the control system including a computer.

12. The system of claim 1, further comprising a control system coupled to the flow control device to position the flow control device among the retracted, first extended, and second extended positions, the control system including:
    a first actuator coupled to the flow control device to position the flow control device between the retracted and first extended positions; and
    a second actuator coupled to the flow control device to position the flow control device between the first and second extended positions.

13. The system of claim 1, further comprising a control system coupled to the flow control device to position the flow control device among the retracted, first extended, and second extended positions, wherein the flow control device includes a first portion and a second portion and wherein only the second portion of the flow control device moves when the flow control device is positioned between the first extended position and the second extended position.

14. The system of claim 1 wherein the airfoil includes at least one leading edge device laterally disposed from the flow control device and wherein the flow control device is at least approximately aerodynamically sealed against a portion of a lateral edge of the leading edge device when the flow control device is in at least one of the first and second extended positions.

15. The system of claim 1 wherein the engine unit includes a pylon and wherein the flow control device is at least approximately aerodynamically sealed against at least a portion of the pylon.

16. The system of claim 1 wherein the engine unit includes a pylon, the engine unit being coupled to the airfoil via the pylon, the engine unit being positioned under the airfoil with a portion of the engine unit extending forward of the leading edge of the airfoil, a portion of the pylon being positioned behind the gap.

17. The system of claim 1 wherein the airfoil, engine unit, and flow control device are installed on an aircraft.

18. The system of claim 1 wherein the flow control device includes a Krueger flap.

19. The system of claim 1 wherein the flow control device includes a slat.

20. The system of claim 1 wherein the flow control device includes a variable camber leading edge device.

21. The system of claim 1, further comprising a control system coupled to the flow control device to position the flow control device among the retracted, first extended, and second extended positions, the control system including:
    a first actuator coupled to the flow control device to position the flow control device between the retracted and first extended positions; and
    a second actuator coupled to the flow control device to position the flow control device between the first and second extended positions; and wherein:
    the engine unit includes a pylon, the engine unit being coupled to the airfoil via the pylon, the engine unit being positioned under the airfoil with a portion of the engine unit extending forward of a leading edge of the airfoil, and
    the flow control device depends from the airfoil and includes multiple flow surface sections movable relative to each other.

22. An aircraft system comprising:
    an airfoil;
    an engine unit at least proximate to the airfoil, the engine unit including a pylon and a housing, the engine unit being coupled to the airfoil via the pylon, the engine unit being positioned under the airfoil with a portion of the engine unit extending forward of a leading edge of the airfoil, a gap extending between a portion of the housing and a portion of the leading edge of the airfoil;
    a flow control device coupled to the airfoil and having multiple flow surface sections movable relative to each other, the flow control device being positionable among at least three stationary positions, including:
        a retracted position in which the gap has a first area through which fluid can flow;
        a first extended position in which the gap is at least approximately aerodynamically sealed; and
        a second extended position in which the gap has a second area through which fluid can flow, the second area being smaller than the first area; and
    a control system coupled to the flow control device to position the flow control device among the retracted, first extended, and second extended positions, the control system including:
        a first actuator coupled to the flow control device to position the flow control device between the retracted and first extended positions; and
        a second actuator coupled to the flow control device to position the flow control device between the first and second extended positions.

23. The system of claim 22 wherein the airfoil, engine unit, and flow control device are installed on an aircraft.

24. An aircraft system comprising:
    an airfoil;
    an engine unit at least proximate to the airfoil with a gap between a portion of the airfoil and a portion of the engine unit; and
    a flow control means for controlling the flow of fluid through the gap, the flow control means having at least three stationary positions, including:
        a retracted position in which the gap has a first area through which fluid can flow;
        a first extended position in which the gap is at least approximately aerodynamically sealed; and
        a second extended position in which the gap has a second area through which fluid can flow, the second area being smaller than the first area.

25. The system of claim 24 wherein the airfoil, engine unit, and flow control means are installed on an aircraft.

26. A method for making an aircraft system comprising:
    installing a flow control device at least proximate to an airfoil and an engine unit having a housing;
    coupling a control system to the flow control device; and
    configuring the control system to position the flow control device among at least three stationary positions, including:
        a retracted position in which a gap extending between a portion of the airfoil and a portion of the housing of the engine unit has a first area through which fluid flows during flight;
        a first extended position in which the gap is at least approximately aerodynamically sealed during flight; and
        a second extended position in which the gap has a second area through which fluid flows during flight, the second area being smaller than the first area.

27. The method of claim 26 wherein installing a flow control device includes installing a flow control device having multiple flow surface sections that are movable relative to each other.

28. The method of claim 26 wherein installing a flow control device at least proximate to an airfoil and an engine unit includes installing a flow control device proximate to an airfoil and an engine unit on an aircraft, the engine unit having a pylon, the engine unit being coupled to the airfoil via the pylon, the engine unit being positioned under the airfoil with a portion of the engine unit extending forward of a leading edge of the airfoil.

29. The method of claim 26 wherein installing a flow control device includes coupling a flow control device to the airfoil.

30. The method of claim 26 wherein installing a flow control device includes coupling a flow control device to a portion of the engine unit.

31. The method of claim 26 wherein configuring a control system includes configuring a computer.

32. The method of claim 26 wherein configuring the control system to position the flow control device includes configuring the control system to position the flow control device in the second extended position to increase at least one of a maximum lift coefficient or a lift to drag ratio of a portion of the airfoil.

33. The method of claim 26 wherein configuring the control system to position the flow control device includes configuring the control system to position the flow control device in the first extended position to increase at least one of a maximum lift coefficient or a lift to drag ratio of a portion of the airfoil.

34. The method of claim 26 wherein configuring the control system to position the flow control device includes configuring the control system to position the flow control device in the first extended position to decrease the drag coefficient of a portion of the airfoil.

35. The method of claim 26 wherein configuring the control system to position the flow control device includes configuring the control system to position the flow control device in the second extended position to decrease the drag coefficient of a portion of the airfoil.

36. The method of claim 26 wherein installing a flow control device at least proximate to an airfoil and an engine unit includes coupling a flow control device to an airfoil on an aircraft, the flow control device having multiple flow surface sections that are movable relative to each other, the engine unit having a pylon, the engine unit being coupled to the airfoil via the pylon, the engine unit being positioned under the airfoil with a portion of the engine unit extending forward of a leading edge of the airfoil.

37. A method for operating an aircraft comprising:
    positioning a flow control device of the aircraft in a first extended position in which a gap extending between a portion of an airfoil and a portion of a housing of an engine unit is at least approximately aerodynamically sealed during flight;
    flying the aircraft with the flow control device in the first extended position;
    positioning the flow control device of the aircraft in a retracted position in which the gap has a first area through which air flows during flight;
    flying the aircraft with the flow control device in the retracted position;
    positioning the flow control device of the aircraft in a second extended position in which the gap has a second area through which air flows during flight, the second area being smaller than the first area; and
    flying the aircraft with the flow control device in the second extended position.

38. The method of claim 37 wherein flying the aircraft with the flow control device in the retracted position includes flying the aircraft during a cruise phase of flight with the flow control device in the retracted position.

39. The method of claim 37 wherein flying the aircraft with the flow control device in the first extended position includes flying the aircraft during a takeoff phase of flight with the flow control device in the first extended position.

40. The method of claim 37 wherein flying the aircraft with the flow control device in the second extended position includes flying the aircraft during a landing phase of flight with the flow control device in the second extended position.

* * * * *